United States Patent
Sato

(10) Patent No.: US 9,148,855 B2
(45) Date of Patent: Sep. 29, 2015

(54) RECEIVER AND COMMUNICATION APPARATUS

(71) Applicant: KABUSHIKI KAISHA TOSHIBA, Minato-ku (JP)

(72) Inventor: Kazumi Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 14/015,023

(22) Filed: Aug. 30, 2013

(65) Prior Publication Data

US 2014/0187176 A1    Jul. 3, 2014

(30) Foreign Application Priority Data

Dec. 28, 2012    (JP) .................................. 2012-288205

(51) Int. Cl.
*H04B 1/38*    (2015.01)
*H04W 52/02*    (2009.01)

(52) U.S. Cl.
CPC .............................. *H04W 52/0225* (2013.01)

(58) Field of Classification Search
CPC ............. H04B 1/40; H04B 1/406; H04B 1/38
USPC ...................................... 455/73, 78
See application file for complete search history.

(56) References Cited

U.S. PATENT DOCUMENTS

| 5,442,636 | A | * | 8/1995 | Bontekoe | 370/509 |
|---|---|---|---|---|---|
| 6,084,922 | A | * | 7/2000 | Zhou et al. | 375/316 |
| 7,009,604 | B2 | * | 3/2006 | Chan et al. | 345/213 |
| 7,065,327 | B1 | * | 6/2006 | Macnally et al. | 455/78 |
| 2003/0128744 | A1 | * | 7/2003 | Yeo et al. | 375/147 |
| 2003/0179781 | A1 | * | 9/2003 | Kauschke et al. | 370/516 |

FOREIGN PATENT DOCUMENTS

| JP | 2002-101029 A | 4/2002 |
|---|---|---|
| JP | 2004-164566 A | 6/2004 |
| JP | 2006-014051 A | 1/2006 |
| JP | 2006-339967 A | 12/2006 |
| JP | 2007-267132 A | 10/2007 |

\* cited by examiner

*Primary Examiner* — April G Gonzales
(74) *Attorney, Agent, or Firm* — White & Case LLP

(57) ABSTRACT

According to one embodiment, a receiver includes: a reception analog circuit, a frame detector, and a controller. One mode among a plurality of modes can be selected for the reception analog circuit. Power consumption is different depending on the modes. The reception analog circuit is configured to process an analog signal received by an antenna to generate a digital signal with first accuracy depending on the selected mode. The frame detector is configured to detect a first frame from the digital signal. The controller is configured to make the reception analog circuit operate on a first mode among the plurality of modes until the first frame is detected and make the reception analog circuit operate on a second mode among the plurality of modes after the first frame is detected. Power consumption of the second mode is higher than power consumption of the first mode.

6 Claims, 9 Drawing Sheets

# RECEIVER AND COMMUNICATION APPARATUS

CROSS REFERENCE TO RELATED APPLICATIONS

This application is based upon and claims the benefit of priority from the prior Japanese Patent Application No. 2012-288205 filed on Dec. 28, 2012, the entire contents of which are incorporated herein by reference.

FIELD

Embodiments described herein relate generally to a receiver and a communication apparatus.

BACKGROUND

It is strongly required to reduce a power consumption of a radio communication apparatus. If, in order to reduce the power consumption of waiting time, the radio communication apparatus is activated only when communicating, there is a problem that activating and setting the radio communication apparatus bothers users. Therefore, one idea is to perform intermittent operation to realize both low power consumption and convenience. However, the intermittent operation may make the time to start the communication longer, which may cause communication trouble.

DETAILED DESCRIPTION

In general, according to one embodiment, a receiver includes a reception analog circuit, a frame detector, and a controller. One mode among a plurality of modes can be selected for the reception analog circuit. Power consumption is different depending on the modes. The reception analog circuit is configured to process an analog signal received by an antenna to generate a digital signal with first accuracy depending on the selected mode. The frame detector is configured to detect a first frame from the digital signal. The controller is configured to make the reception analog circuit operate on a first mode among the plurality of modes until the first frame is detected and make the reception analog circuit operate on a second mode among the plurality of modes after the first frame is detected. Power consumption of the second mode is higher than power consumption of the first mode.

Embodiments will now be explained with reference to the accompanying drawings.

(First Embodiment)

Figure 1:
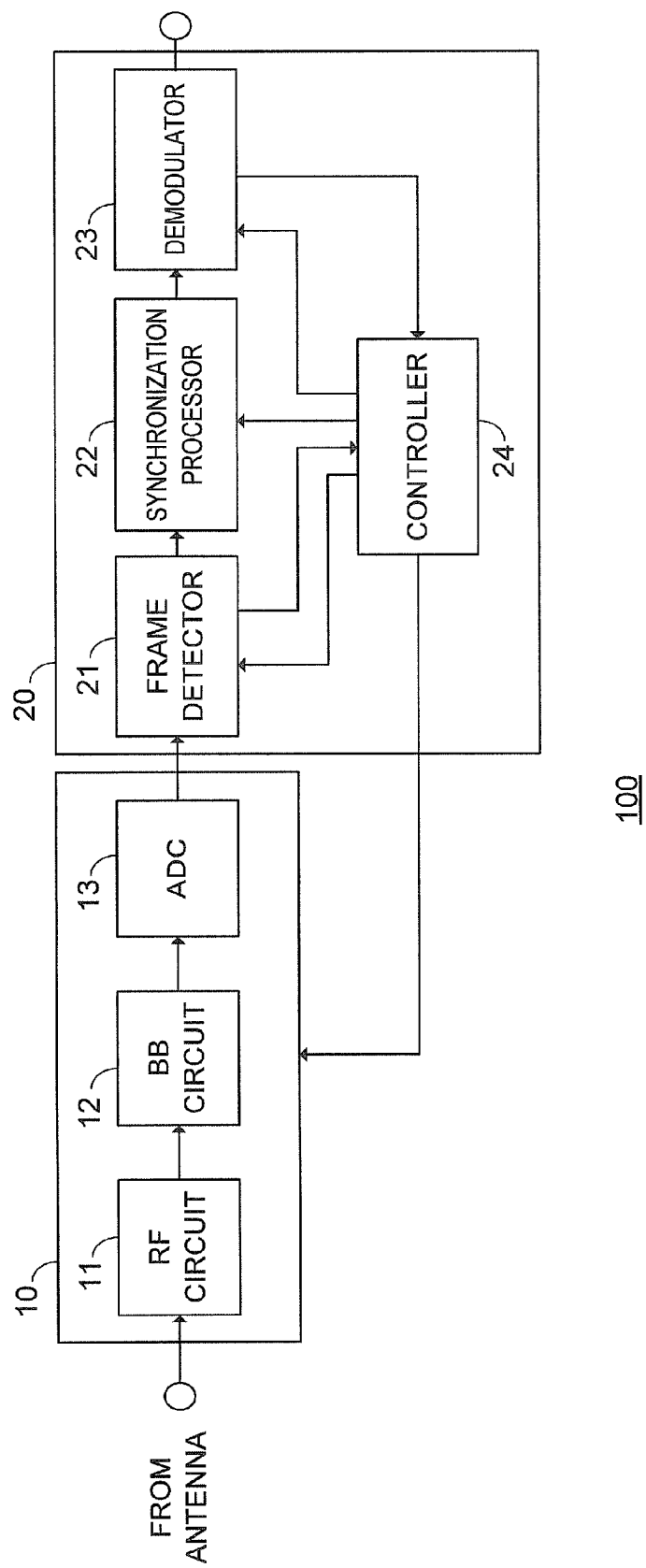
FIG. 1 is a block diagram showing a schematic configuration of a receiver 100 according to a first embodiment.

FIG. 1 is a block diagram showing a schematic configuration of a receiver 100 according to a first embodiment. The receiver 100 has a reception analog circuit 10 and a reception digital circuit 20.

The reception analog circuit 10 processes an analog signal received by an antenna (not shown) to generate a digital signal. The reception analog circuit 10 has an RF circuit 11, a baseband (BB) circuit 12, and an A-D (Analog to Digital) converter (ADC) 13.

The RF circuit 11 converts the received analog signal from radio frequency to baseband. The baseband circuit 12 performs filtering for retrieving a signal having a desired frequency from the analog signal whose baseband is converted to the baseband bandwidth, to remove the undesired frequency component. The A-D converter 13 converts the output signal from the baseband circuit 12 to a digital signal, to supply the reception digital circuit 20 with the digital signal.

Here, the reception analog circuit 10 can select one mode among a plurality of modes, the power consumption being different depending on the modes. For example, the reception analog circuit 10 can operate on a low power consumption mode (first mode) or on a high power consumption mode (second mode). On the low power consumption mode, the power consumption of the reception analog circuit 10 can be smaller while the conversion accuracy from the analog signal to the digital signal is relatively lower. On the other hand, on the high power consumption mode, the power consumption of the reception analog circuit 10 becomes relatively larger while the conversion accuracy from the analog signal to the digital signal can be higher. The accuracy means, for example, an S/N ratio or infection degree of interfering waves and so on.

In the present embodiment, the low power consumption mode and the high power consumption mode are switched, thereby realizing the receiver 100 whose power consumption is totally low and whose response for starting communication is totally fast. Specific example of operations on the low power consumption mode and on the high power consumption mode will be explained later.

The reception digital circuit 20 has a frame detector 21, a synchronization processor 22, a demodulator 23, and a controller 24. The frame detector 21 detects a predetermined frame from the digital signal and notifies the detection to the controller 24. The synchronization processor 22 performs synchronization process on the detected frame. The demodulator 23 performs frame demodulation process to retrieve data from the frame. If the demodulated frame is a final frame of a successive frame group (hereinafter, referred to as "terminal frame"), the demodulator 23 notifies to the controller 24 that the terminal frame is demodulated. The controller 24 controls each part in the reception analog circuit 10 and the reception digital circuit 20.

The controller 24 will be explained in more detail. The controller 24 makes the reception analog circuit 10 operate on the low power consumption mode until the frame detector 21 detects the frame. The conversion accuracy from the analog signal to the digital signal does not always have to be high for only detecting the frame. Therefore, by setting the low power consumption mode until the frame is detected, it is possible to reduce the power consumption.

However, the received frame on the lower power consumption mode may be demodulated incorrectly because the conversion accuracy is not high. Therefore, when the frame detector 21 detects the frame, the controller 24 makes the reception analog circuit 10 operate on the high power consumption mode. As a result, the reception analog circuit 10 can generate the digital signal with high accuracy, and the demodulator 23 can perform the demodulation process correctly.

Note that, although an initial frame received on the low power consumption mode may be demodulated incorrectly, the same frame is retransmitted and retransmitted frame can be received, which means that specific problems do not occur.

As sated, the frame detection process is always performed, and thus, the mode is switched to the high power consumption mode quickly when the frame is detected. As a result, the response time for starting the communication does not become drastically longer.

After that, when the terminal frame is received, the controller 24 makes the reception analog circuit 10 operate on the low power consumption mode again.

Furthermore, the controller 24 may activate the synchronization processor 22 and/or the demodulator 23 after the frame is detected. Moreover, the controller 24 may not activate the synchronization processor 22 and/or the demodulator 23 after the frame is detected on the low power consumption mode, and may activate the synchronization processor 22 and/or demodulator 23 after the frame is detected on the high power consumption mode.

Figure 2:
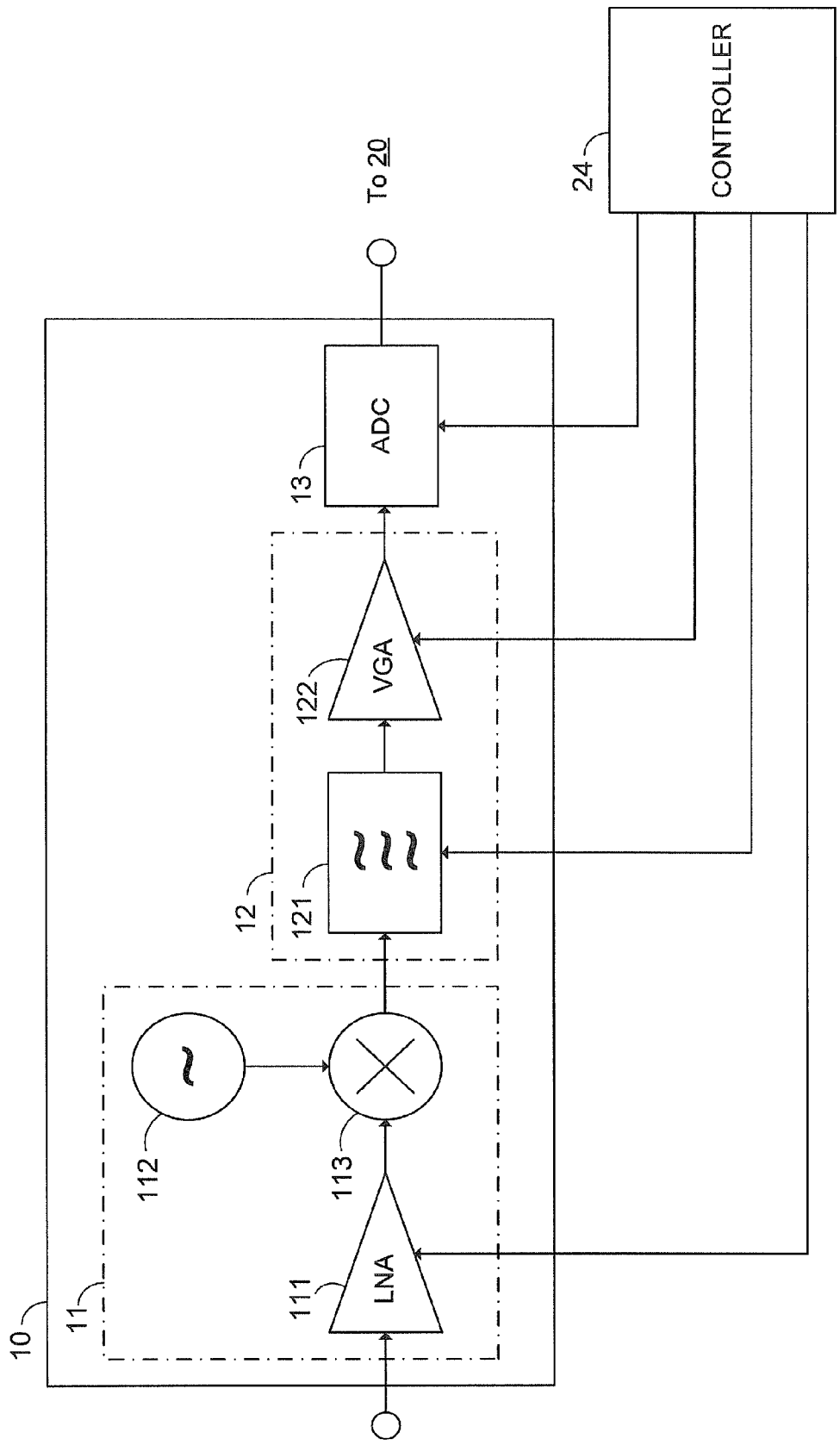
FIG. 2 is a block diagram showing an example of an internal configuration of each part of the reception analog circuit 10.

Hereinafter, the relationship between each part and operation mode will be described in more detail. FIG. 2 is a block diagram showing an example of an internal configuration of each part of the reception analog circuit 10.

The RF circuit 11 has an LNA (Low Noise Amplifier, first amplifier) 111, an oscillator 112, and a mixer 113. The LNA 111 amplifies the analog signal received by the antenna. The oscillator 112 generates a local oscillator signal having a predetermined frequency. The mixer 113 mixes the local oscillator signal with the output signal from the LNA 111 to convert the frequency bandwidth of the analog signal from the radio frequency bandwidth to the baseband bandwidth.

The baseband circuit 12 has a filter 121, and a VGA (Variable Gain Amplifier) 122. The filter 12 removes the undesired frequency component from the output signal from the mixer 113. The VGA 122 amplifies the output signal from the filter 121.

The controller 24 controls at least one of the RF circuit 11, the baseband circuit 12 and the A-D converter 13 to set the reception analog circuit 10 to be the high power consumption mode or the low power consumption mode.

Figure 3:
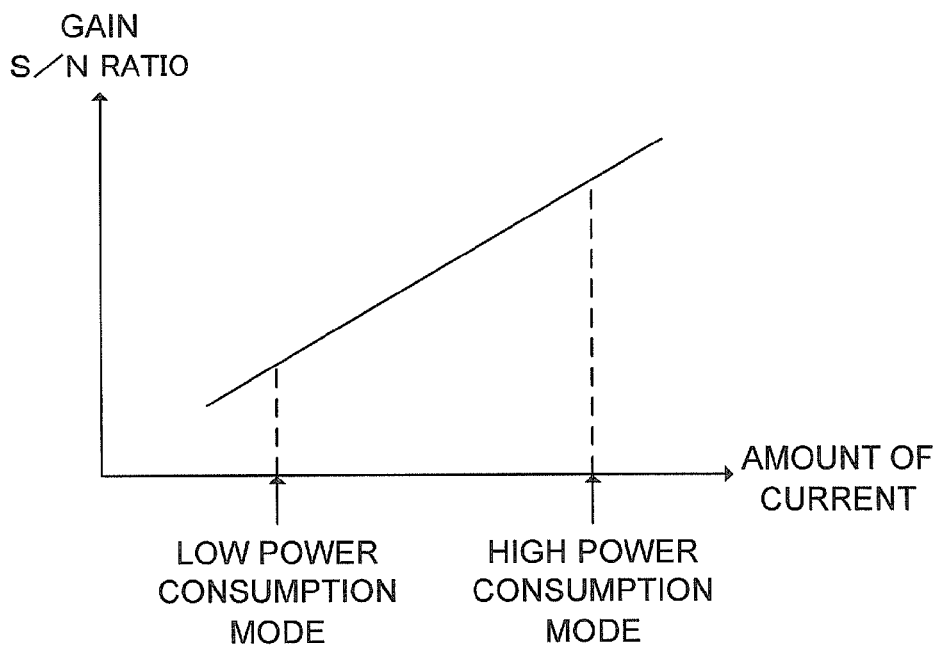
FIG. 3 is a diagram schematically showing a relationship between an amount of current flowing in the LNA 111 and a gain or an S/N ratio.

For example, the controller 24 adjusts a current flowing in the LNA 111 according to whether the set mode is the high power consumption mode or the low consumption mode. FIG. 3 is a diagram schematically showing a relationship between an amount of current flowing in the LNA 111 and a gain or an S/N ratio. As shown in FIG. 3, as the amount of current is larger, the gain becomes higher and the S/N ratio improves. That is, as the amount of current is larger, the LNA 111 can amplify the input signal with higher accuracy. Therefore, as stated above, on the high power consumption mode, the reception analog circuit 10 can generate the digital signal with high accuracy by setting the amount of current flowing in the LNA 111 large. On the other hand, on the low power consumption mode, the amount of current may be set smaller as long as the frame detector 21 can perform the frame detection.

Similarly, the controller 24 may adjust a current flowing in the VGA 122 according to the set mode is the high power consumption mode or the low power consumption mode. With regard to the VGA 122, the relationship between the amount of current and the gain (or the S/N ratio) is similar to that shown in FIG. 3. Therefore, it is possible to set the amount of current flowing in the VGA 122 larger on the high power consumption mode and set it smaller on the low power consumption mode.

Figure 4:
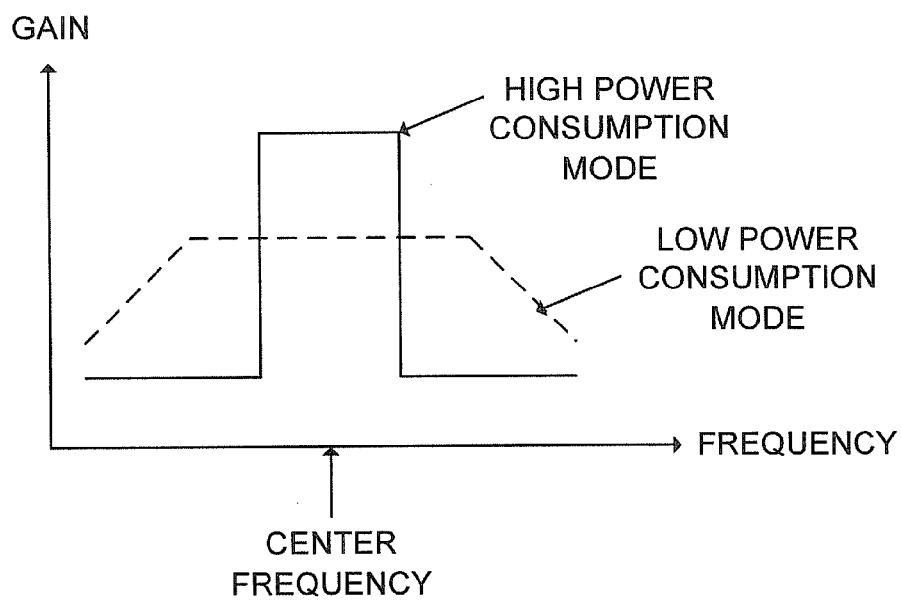
FIG. 4 is a diagram schematically showing the frequency characteristics.

Furthermore, the controller 24 may adjust the frequency characteristics of the filter 121 according to whether the set mode is the high power consumption mode or the low power consumption mode. FIG. 4 is a diagram schematically showing the frequency characteristics, the horizontal axis shows a frequency and the vertical axis shows a gain. Furthermore, the solid line shows the characteristics of the high power consumption mode, and the dashed line shows that of the low power consumption mode.

When setting the amount of current flowing in the filter 121 larger, the filter 121 can retrieve the frequency bandwidth having a relatively narrow range whose center is a center frequency. Therefore, the influence of interfering waves having different frequency bandwidth can be small. As a result, the reception analog circuit 10 can generate the digital signal with high accuracy.

On the other hand, when setting the amount of current flowing in the filter 121 smaller, the filter 121 retrieves the frequency bandwidth having a relatively broad range whose center is a center frequency.

Taking such frequency characteristics of the filter 121, the controller 24 sets the amount of current flowing in the filter 121 to be large. On the other hand, the controller 24 may set it to be small as long as the frame detector 21 can perform the frame detection.

Figure 5:
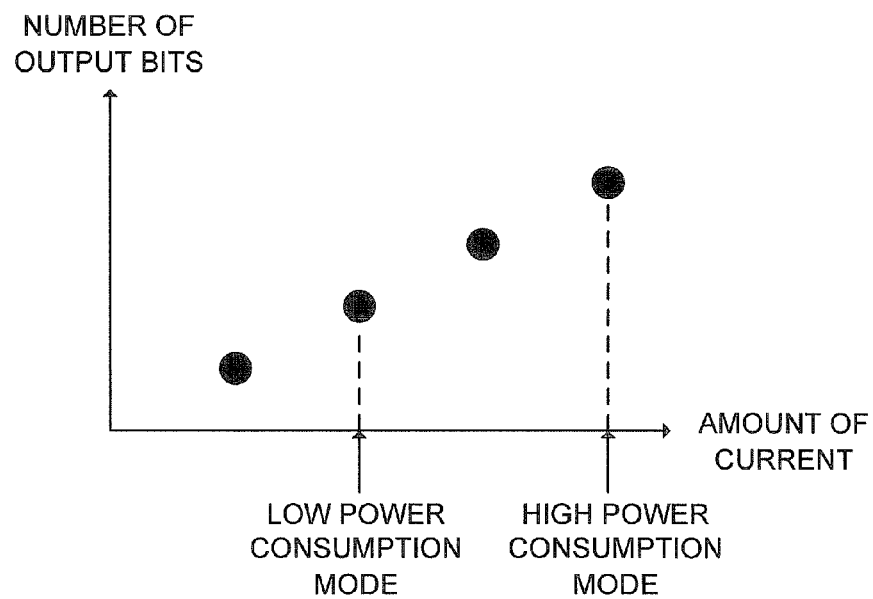
FIG. 5 is a diagram schematically showing a relationship between the amount of current flowing in the A-D converter 13 and the number of bits of the output signal.

Furthermore, when the A-D converter 13 can variably-adjust the number of bits of the output signal, the controller 24 may adjust the number of bits of the A-D converter 13. FIG. 5 is a diagram schematically showing a relationship between the amount of current flowing in the A-D converter 13 and the number of bits of the output signal. As shown in FIG. 5, as the number of bits of the output signal is larger, the amount of current becomes larger. Therefore, the controller 24 sets the number of bits larger when the set mode is the high power consumption mode. By such a manner, the reception analog circuit 10 can generate the digital signal with high accuracy. On the other hand, when the set mode is the low power consumption mode, the controller 24 may set the number of bits smaller as long as the frame detector 21 can perform the frame detection.

As explained above, the controller 24 controls at least one of the RF circuit 11, the baseband circuit 12 and the A-D converter 13, more specifically, at least one of the LNA 111, the filter 121, the VGA 122 and the A-D converter 13, thereby making the reception analog circuit 10 operate on the high power consumption mode where the digital signal can be generated with high accuracy or operate on the low power consumption mode where the power consumption can be reduced.

Incidentally, on the low power consumption mode, the digital signal is not always generated with high accuracy, and gain may be insufficient, noise may be included, and/or there may be infections of interfering waves. Therefore, on the low power consumption mode, setting is desirable where the frames are easily detected even if there are some error detections in order to avoid failure of frame detection.

Figure 6:
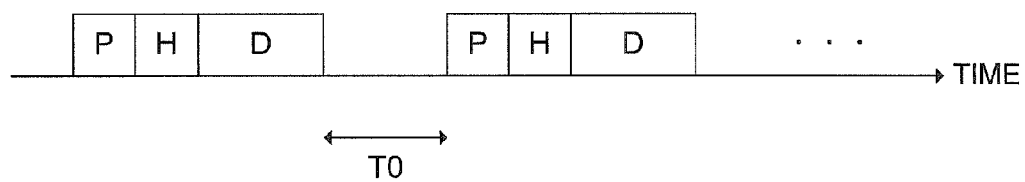
FIG. 6 is a diagram of an example of the frame configuration.

FIG. 6 is a diagram of an example of the frame configuration. One frame is composed of a preamble P, a header H and data D. The preamble includes a predetermined frame start pattern and so on. The head H shows the frame configuration and indicates how much bits of the data D succeed. The data D is data to be transmitted to the receiver 100.

As shown in FIG. 6, one frame is transmitted, and then, next frame is transmitted after a predetermined period T0. Generally, if the frame transmission has not been successful, the same frame is transmitted again. Alternatively, regardless of whether or not the frame transmission has been successful, the same frames are transmitted for several times for improving certainty. Therefore, in the present embodiment, the receiver 100 detects that a valid frame is transmitted by the first frame, and demodulates the second and following frames to obtain the data D.

Figure 7A:
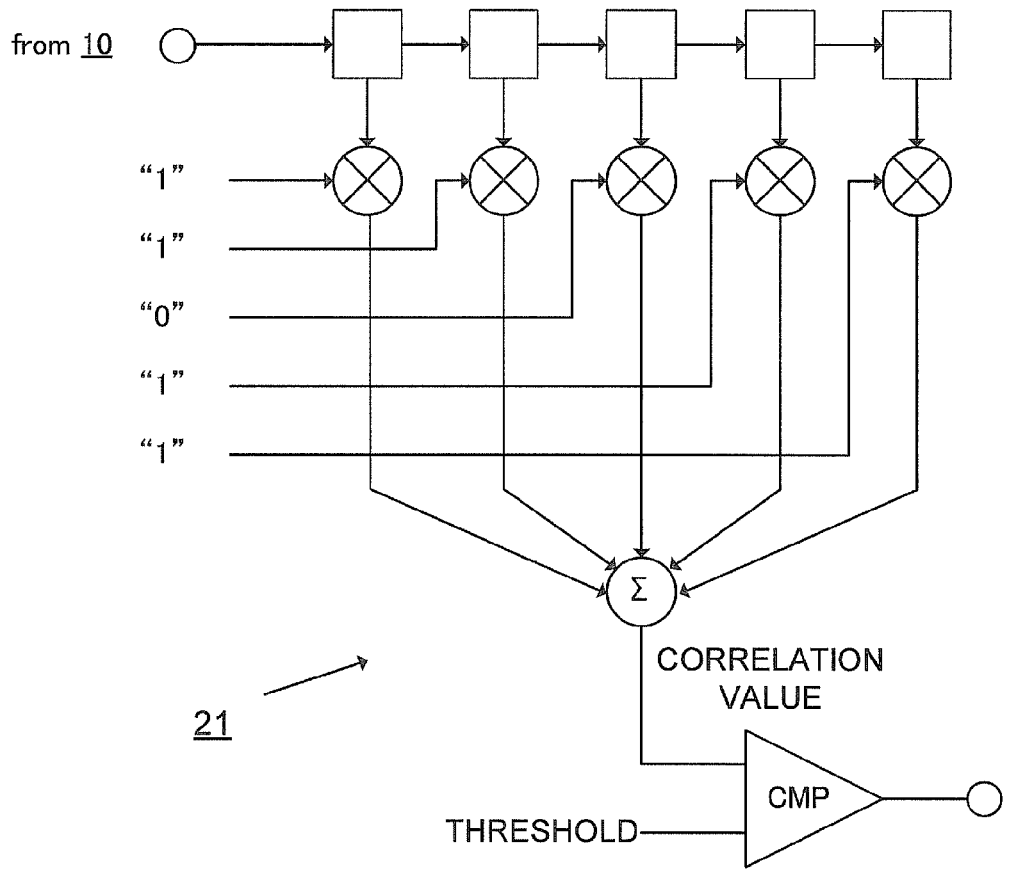
FIGS. 7A and 7B are diagrams for explaining processing operations of the frame detector 21.
Figure 7B:
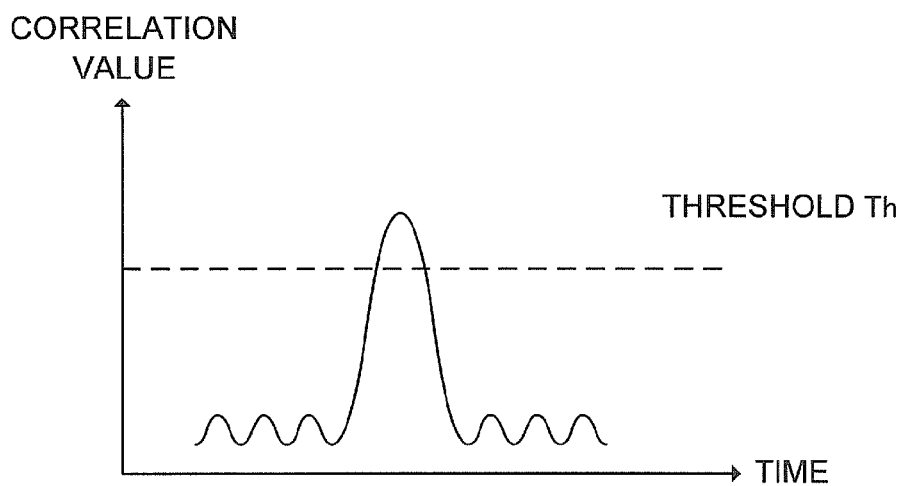

FIGS. 7A and 7B are diagrams for explaining processing operations of the frame detector 21. The frame detector 21 detects the frame by matched-filter processing. More specifically, the frame detector 21 detects the frame based on whether or not the digital signal includes a pattern, the correlation value between which and the predetermined frame start pattern exceeds a threshold.

For the simple explanation, FIG. 7A shows an example where the frame start pattern has 5 bits of "11011". As shown in FIG. 7A, by shifting the digital signal by a shift register, the frame detector 21 calculates the correlation value to the frame start pattern. Then, as shown in FIG. 7B, if the correlation value exceeds the threshold, the frame detector 21 determines that there is a frame.

Figure 8:
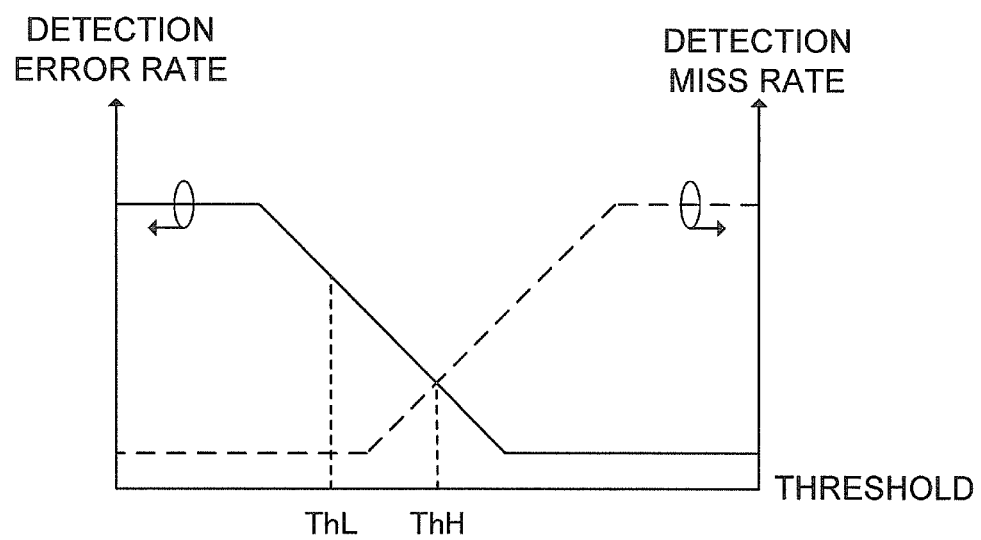
FIG. 8 is a diagram schematically showing a relationship between the threshold and the detection error rate.

FIG. 8 is a diagram schematically showing a relationship between the threshold and the detection error rate. As shown by the dashed line in FIG. 8, the detection miss (cannot detect the frame) rate can be small by setting the threshold low and becomes large by setting the threshold high. On the other hand, as shown by the solid line in FIG. 8, the detection error (recognize non-frame as the frame) rate can be small by setting the threshold high and becomes large by setting the threshold low. Thus, by adjusting the threshold, even if the accuracy of the digital signal generated by the reception analog circuit 10 is low, the detection miss rate can be small by accepting some detection error.

Therefore, on the low power mode, the controller 24 sets the threshold of the frame detector 21 low (first threshold ThL), accepting some detection error. Accordingly, the detection miss of the frame can be decreased even if the operation accuracy of the reception analog circuit 10 is not high.

On the other hand, on the high power consumption mode, the controller 24 sets the optimum threshold (second threshold ThH) for suppressing both detection error and detection miss. As apparent from FIG. 8, the threshold ThH for the high power consumption mode is higher than the threshold ThL for the low power consumption mode.

Figure 9:
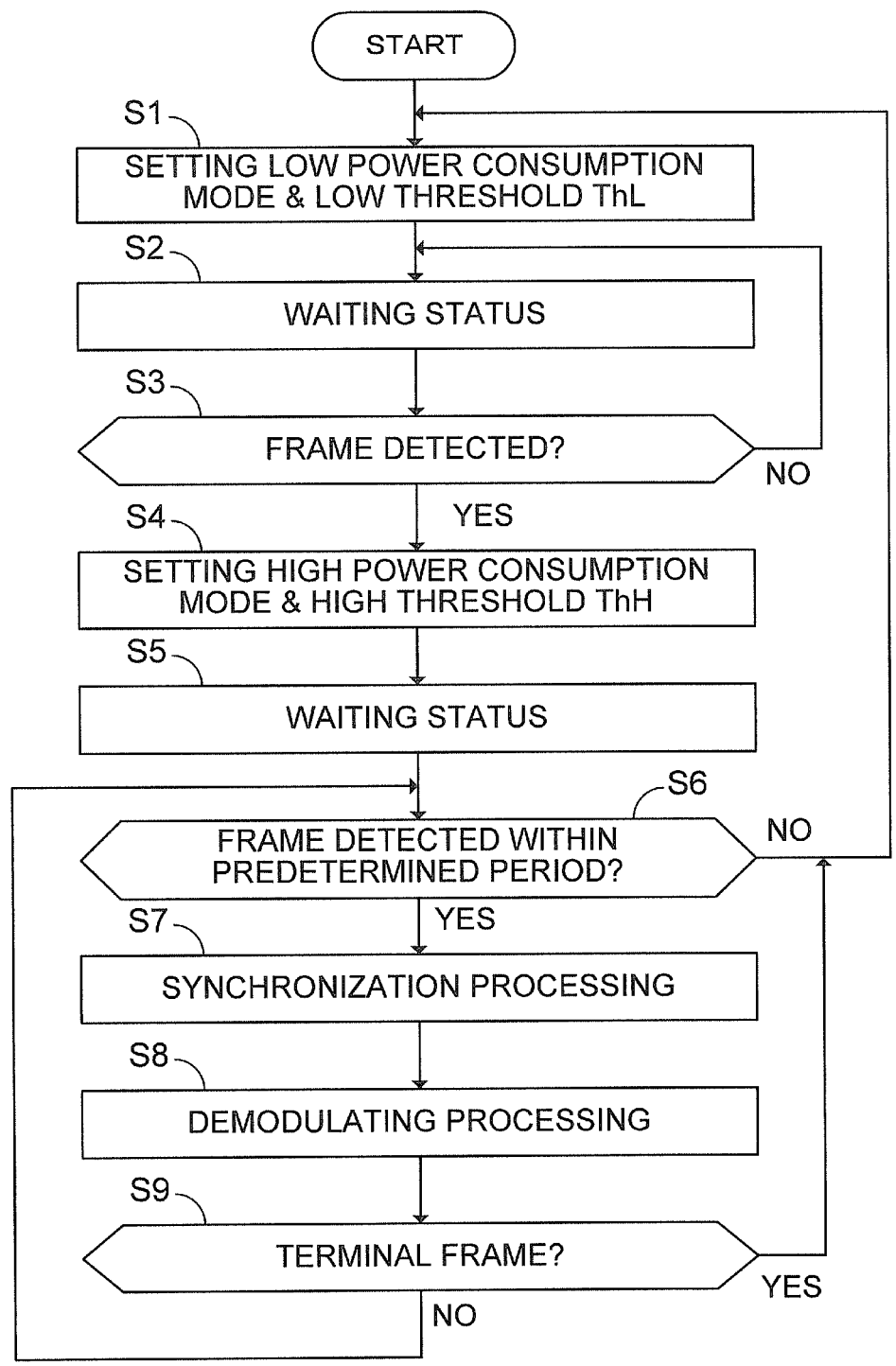
FIG. 9 is a flowchart showing an example of the receiver 100.

FIG. 9 is a flowchart showing an example of the receiver 100. Until the frame is detected, the controller 24 sets the reception analog circuit 10 to be the low power consumption mode and sets the threshold of the frame detector 21 to be the low value ThL (Step S1). As a result, the receiver 100 becomes a first waiting status (Step S2). In this waiting status, the power consumption is low and the frame is easily detected.

The frame detector 21 detects the frame on the waiting status (Step S3—YES), the controller 24 sets the reception analog circuit 10 to be the high power consumption mode and sets the threshold of the frame detector 21 to be the high value ThH (Step S4). As a result, the receiver 100 becomes a second waiting status (Step S5). This waiting mode is different from that of Step S2, that is, the frame can be detected and demodulated accurately though the power consumption is high.

Here, if the frame detector 21 cannot detect the frame again within a predetermined period (Step S6—NO), returning back to S1, the controller 24 sets the reception analog circuit 10 to be the low power consumption mode and sets the threshold of the frame detector 21 to be the low value ThL. The above predetermined period is, for example, set slightly larger than the period T0 shown in FIG. 6.

If the frame detection at Step S3 is correct, the frame should be again detected after the period T0. However, if the frame is not detected after the period T0, there is a high possibility that the frame detection at Step S3 has been a detection error. As shown in FIG. 8, such detection error is within the scope of the assumption. Therefore, if the second frame is not detected within the predetermined period, the reception analog circuit 10 goes back to the low power consumption mode.

On the other hand, if the frame detection at Step S3 is correct, the frame is again detected after the period T0 (Step S6—YES). In this case, the controller 24 activates the synchronization processor 22 to perform synchronization processing (Step S7) and activates the demodulator 23 to perform demodulation processing (Step S8).

As the result of the demodulation, if the received frame is the terminal frame (Step S9—YES), returning back to Step S1, the controller 24 sets the reception analog circuit 10 to be the low power consumption mode and sets the threshold of the frame detector 21 to be the low value ThL because the possibility to successively receive the frame is low. If the received frame is not the terminal frame (Step S9—NO), reception processing of Steps S6 to S8 continue.

As stated above, in the first embodiment, the reception analog circuit 10 is made operate on the low power consumption mode until the frame is received, and operate on the high power consumption mode after the frame is received. As a result, it is possible to reduce the power consumption of the receiver 100 without widely lengthen the time for starting communication.

(Second Embodiment)

In a second embodiment which will be explained below, the operation of the A-D converter 13 is stopped on the low power consumption mode.

Figure 10:
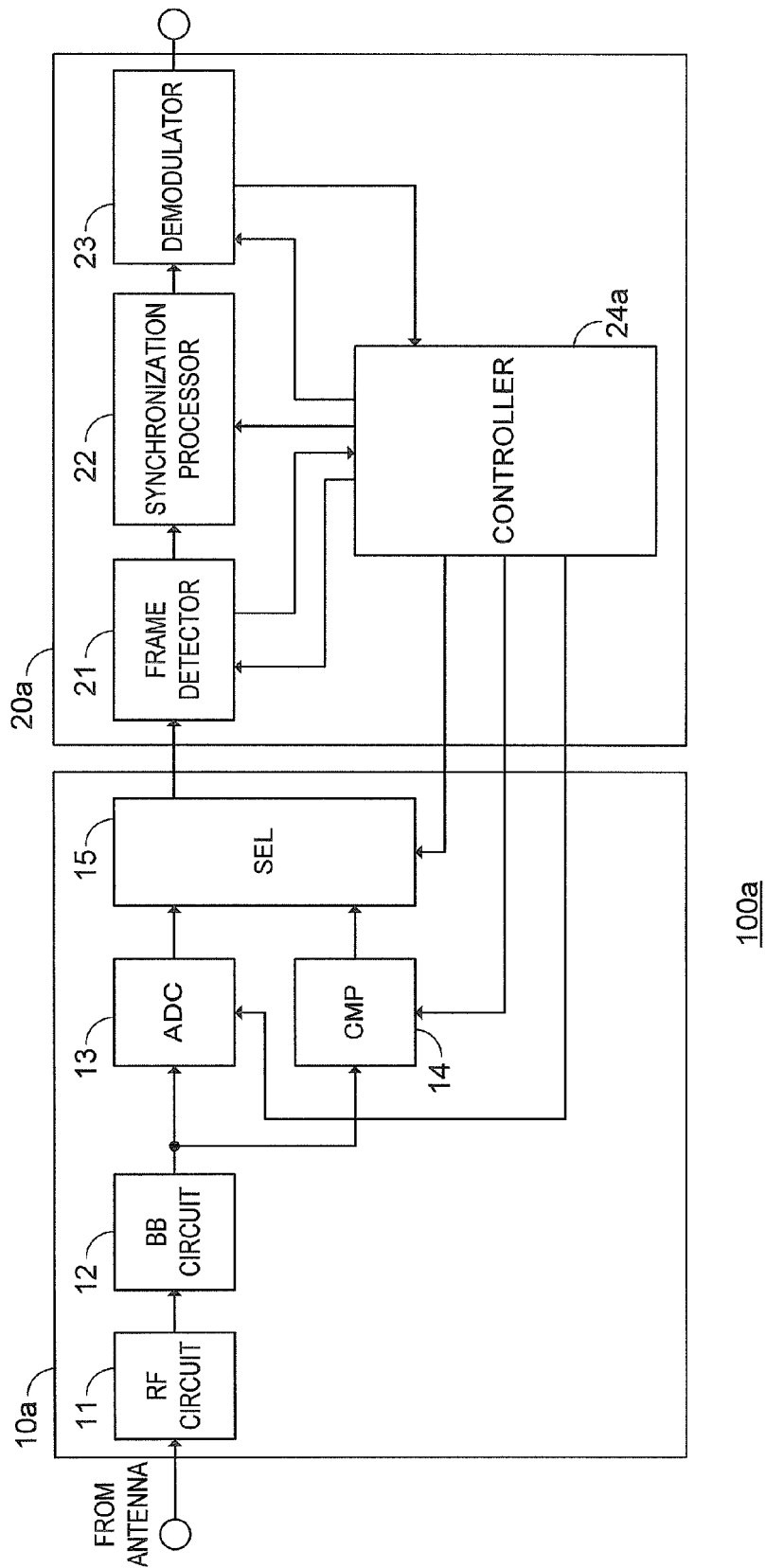
FIG. 10 is a block diagram of a schematic configuration of the receiver 100a according to the second embodiment.

FIG. 10 is a block diagram of a schematic configuration of the receiver 100a according to the second embodiment. In FIG. 10, components common to those of FIG. 1 have common reference numerals, respectively. Hereinafter, difference from FIG. 1 will be mainly described below.

The reception analog circuit 10a of FIG. 10 further has a comparator (CMP) 14 and a selector (SEL) 15. The A-D converter 13 converts the output signal from the baseband circuit 12 to be a digital signal (first digital signal) of two or more bits, while the comparator 14 converts the output signal from the baseband circuit 12 to be a digital signal (second digital signal) of one bit. Due to the difference of the number of bits, the power consumption of the A-D converter 13 is higher than that of the comparator 14. The selector 15 selects one of the output of the A-D converter 13 and that of the comparator 14, to supply the selected one to the reception digital circuit 20a.

The controller 24a of the reception digital circuit 20a controls the A-D converter 13, the comparator 14 and the selector 15.

On the low power consumption mode, the controller 24a stops the A-D converter 13 and makes only the comparator 14 operate. Then, the controller 24 controls the selector 15 so as to output the output from the comparator 14 to the reception digital circuit 20a. The frame detector 21 performs the frame detection from the digital signal of one bit. Since the digital signal has only one bit, the detection error may be increases. However, the power consumption of the reception analog circuit 10a can be drastically reduced.

Needless to say, on the low power consumption mode, it is desirable to set the threshold of the frame detector 21 to be low. Furthermore, in order to further reduce the power consumption, the baseband circuit 12 may be stopped, and the output from the RF circuit 11 can be inputted to the comparator 14 directly.

On the other hand, on the high power consumption mode, the controller 24a makes the A-D converter 13 operate. Then, the controller 24 controls the selector 15 so as to output the output from the A-D converter 13 to the reception digital circuit 20a. As a result, the frame detector 21 can detect the frame accurately.

Note that, also in the second embodiment, the controller 24a can control the RF circuit 11 and/or the baseband circuit 12 according to whether the operation mode of the reception analog circuit 10a is the high power operation mode or the low power operation mode.

As stated above, in the second embodiment, the A-D converter 13 is stopped on the low power consumption mode and the comparator 14 is used. As a result, the power consumption can be further reduced.

Note that, FIG. 10 shows an example where the reception analog circuit 10a has the selector 15. However, the selector 15 can be provided in the reception digital circuit 20a. In this case, the output from the A-D converter 13 and the comparator 14 can be transmitted from the reception analog circuit 10a to the reception digital circuit 20a.

(Third Embodiment)

The above explained first and second embodiments relate to the receiver. On the other hand, a third embodiment which will be explained below relates to a communication apparatus having not only the reception function but also the transmission function.

Figure 11:
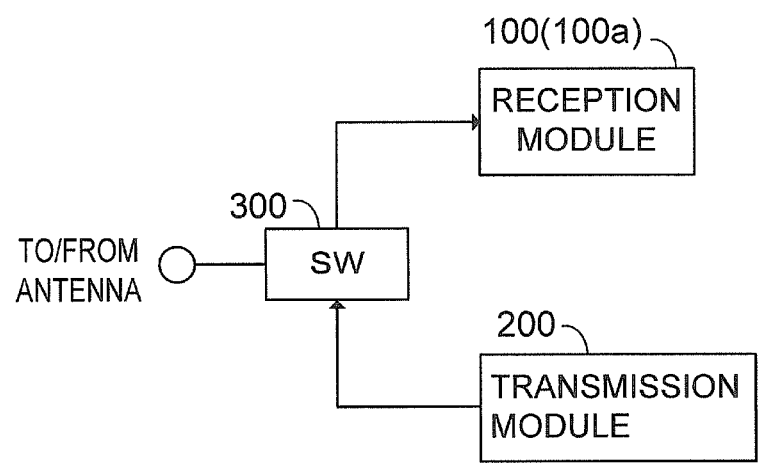
FIG. 11 is a block diagram showing a schematic configuration of the radio communication apparatus.

FIG. 11 is a block diagram showing a schematic configuration of the radio communication apparatus. The radio communication apparatus has a reception module 100 (100a), a transmission module 200, and a switch (SW) 300.

The reception module 100 (100a) receives a signal from an antenna, which can be the receiver 100 of the first embodiment or the receiver 100a of the second embodiment.

The transmission module transmits a signal from the antenna. As an example, the transmission module has a modulator, a D-A converter, a mixer and an amplifier. The modulator modulates data to be transmitted. The D-A converter converts the output signal form the modulator to an analog signal. The mixer converts the frequency of the analog signal to the radio frequency. The amplifier amplifies the output signal from the mixer.

The switch 300 controls whether to transmit the signal generated by the transmission module from the antenna or to supply the signal received by the antenna to the reception module.

As stated above, in the radio communication apparatus having the reception module 100 and the transmission module 200, the power consumption of the communication apparatus can be reduced without widely lengthening the time for starting communication by switching the operation mode of the reception module to the high power consumption mode or the low power consumption mode.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A receiver comprising:
a reception analog circuit, for which one mode among a plurality of modes can be selected, power consumption being different depending on the modes, to process an analog signal received by an antenna to generate a digital signal with first accuracy depending on the selected mode;
a frame detector configured to detect a first frame from the digital signal;
a controller configured to make the reception analog circuit operate on a first mode among the plurality of modes until the first frame is detected and make the reception analog circuit operate on a second mode among the plurality of modes after the first frame is detected, power consumption of the second mode being higher than power consumption of the first mode;
an RF circuit configured to convert the received analog signal from radio frequency to baseband;
a baseband circuit configured to perform filtering on an output signal from the RF circuit;
an A-D (analog to digital) converter configured to convert an output signal from the baseband circuit to the digital signal;
a first amplifier configured to amplify the received analog signal;
an oscillator configured to generate a reference signal; and
a mixer configured to convert an output signal from the first amplifier from the radio frequency to the baseband using the reference signal,
wherein the controller adjusts an amount of current flowing in at least one of the RF circuit and the baseband circuit according to whether the selected mode is the first mode or the second mode,
wherein the baseband circuit comprises:
a filter configured to perform filtering on an output signal from the mixer; and
a second amplifier configured to amplify an output signal from the filter,
wherein the controller adjusts the amount of current flowing in at least one of the first amplifier, the filter and the second amplifier according to whether the selected mode is the first mode or the second mode.

2. A receiver comprising:
a reception analog circuit, for which one mode among a plurality of modes can be selected, power consumption being different depending on the modes, to process an analog signal received by an antenna to generate a digital signal with first accuracy depending on the selected mode;
a frame detector configured to detect a first frame from the digital signal;
a controller configured to make the reception analog circuit operate on a first mode among the plurality of modes until the first frame is detected and make the reception analog circuit operate on a second mode among the plurality of modes after the first frame is detected, power consumption of the second mode being higher than power consumption of the first mode;

wherein the reception analog circuit comprises:

an RF circuit configured to convert the received analog signal from radio frequency to baseband;

a baseband circuit configured to perform filtering on an output signal from the RF circuit; and an A-D (analog to digital) converter configured to convert an output signal from the baseband circuit to the digital signal, a number of bit of an output signal from the A-D converter being variable, wherein the number of bit of the output signal from the A-D converter when the second mode is selected is larger than that when the first mode is selected.

3. A receiver comprising:

a reception analog circuit, for which one mode among a plurality of modes can be selected, power consumption being different depending on the modes, to process an analog signal received by an antenna to generate a digital signal with first accuracy depending on the selected mode;

a frame detector configured to detect a first frame from the digital signal;

a controller configured to make the reception analog circuit operate on a first mode among the plurality of modes until the first frame is detected and make the reception analog circuit operate on a second mode among the plurality of modes after the first frame is detected, power consumption of the second mode being higher than power consumption of the first mode;

wherein the reception analog circuit comprises:

an RF circuit configured to convert the received analog signal from radio frequency to baseband;

a baseband circuit configured to perform filtering on an output signal from the RF circuit;

an A-D (analog to digital) converter to convert an output signal from the baseband circuit to a first digital signal comprising more than one bit; and a comparator configured to convert the output signal from the baseband signal to a second digital signal comprising one bit, wherein when the first mode is selected, the controller stops the A-D converter and supplies the second digital signal to the frame detector, and the frame detector detects the first frame from the second digital signal, and when the second mode is selected, the controller makes the A-D converter operate and supplies the first digital signal to the frame detector, and the frame detector detects the first frame from the first digital signal.

4. The receiver of claim 1, wherein the controller makes the reception analog circuit operate on the first mode when a terminal frame is detected.

5. The receiver of claim 1, wherein the controller makes the reception analog circuit operate on the second mode when the first frame is detected, and then, makes the reception analog circuit operate on the first mode if the first frame is not detected again within a first period.

6. A receiver comprising:

a reception analog circuit, for which one mode among a plurality of modes can be selected, power consumption being different depending on the modes, to process an analog signal received by an antenna to generate a digital signal with first accuracy depending on the selected mode;

a frame detector configured to detect a first frame from the digital signal;

a controller configured to make the reception analog circuit operate on a first mode among the plurality of modes until the first frame is detected and make the reception analog circuit operate on a second mode among the plurality of modes after the first frame is detected, power consumption of the second mode being higher than power consumption of the first mode;

wherein the frame detector detects the first frame based on whether the digital signal comprises a pattern whose correlation value with a frame start pattern is over a threshold, and the controller sets the threshold to be a first value until the first frame is detected, and sets the threshold to be a second value when the first frame is detected, the second value being higher than the first value.

* * * * *